(12) United States Patent
Arambepola et al.

(10) Patent No.: US 9,385,905 B2
(45) Date of Patent: Jul. 5, 2016

(54) BLOCK-BASED TIME-FREQUENCY INTERLEAVING AND DE-INTERLEAVING

(71) Applicant: Intel Corporation, Santa Clara, CA (US)

(72) Inventors: Bernard Arambepola, Enfield (GB); Thushara Hewavithana, Hatfield (GB)

(73) Assignee: Intel Corporation, Santa Clara, CA (US)

( * ) Notice: Subject to any disclaimer, the term of this patent is extended or adjusted under 35 U.S.C. 154(b) by 219 days.

(21) Appl. No.: 14/197,151

(22) Filed: Mar. 4, 2014

(65) Prior Publication Data

US 2014/0247803 A1 Sep. 4, 2014

Related U.S. Application Data

(60) Provisional application No. 61/772,194, filed on Mar. 4, 2013.

(51) Int. Cl.
*H04L 27/26* (2006.01)
*H04L 1/00* (2006.01)

(52) U.S. Cl.
CPC .......... *H04L 27/2608* (2013.01); *H04L 1/0071* (2013.01)

(58) Field of Classification Search
CPC .... H04B 7/0613; H04J 11/00; H04J 11/0063; H04L 5/007; H04L 27/28; H04L 45/10; H04N 5/76; H04N 7/173; H04N 9/8042
See application file for complete search history.

(56) References Cited

U.S. PATENT DOCUMENTS

| | | | | |
|---|---|---|---|---|
| 5,627,935 A | * | 5/1997 | Kim | H04N 9/8042 386/263 |
| 6,807,145 B1 | * | 10/2004 | Weerackody | H04B 7/0613 370/203 |
| 2003/0046706 A1 | * | 3/2003 | Rakib | H04L 45/10 725/111 |
| 2008/0181319 A1 | * | 7/2008 | Kao | H04L 5/0007 375/260 |
| 2012/0140612 A1 | * | 6/2012 | Petrov | H04J 11/0063 370/207 |

* cited by examiner

*Primary Examiner* — Andrew Lai
*Assistant Examiner* — Leon Andrews
(74) *Attorney, Agent, or Firm* — Garrett IP, LLC

(57) ABSTRACT

Block-based interleaving to process a block of sub-carriers as a two-dimensional array defined by a frequency dimension and a time dimension. For each symbol of the array a cell is selected at each frequency index of the array in a diagonal wrap-around fashion. The array may be traversed with a modulo-based index computed as a function of an incrementing frequency index, a symbol index, and a modulus defined by a depth of the array. Cells may be selected as indicated by the frequency and time indices, and/or as indicated by a bit-reversed representation of the frequency index and/or the time index. A block interleaver may be configured to time interleave without impacting frequency, or interleave in time and frequency. Frequency interleaving may performed with the bit-reversed representation of the frequency index.

20 Claims, 10 Drawing Sheets

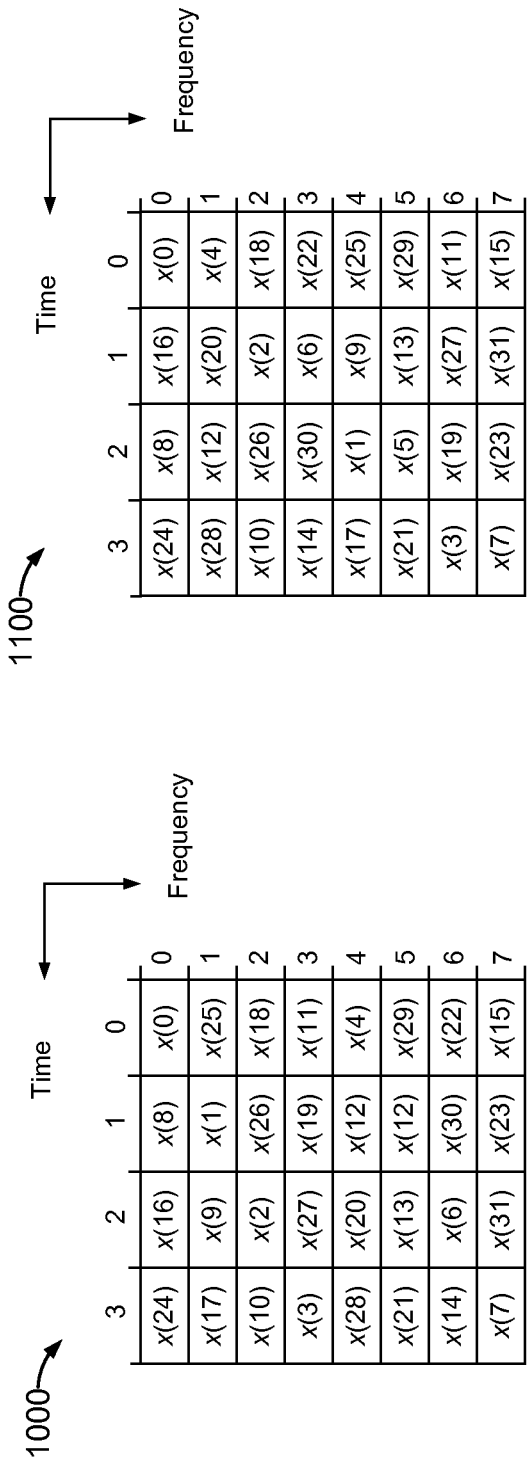

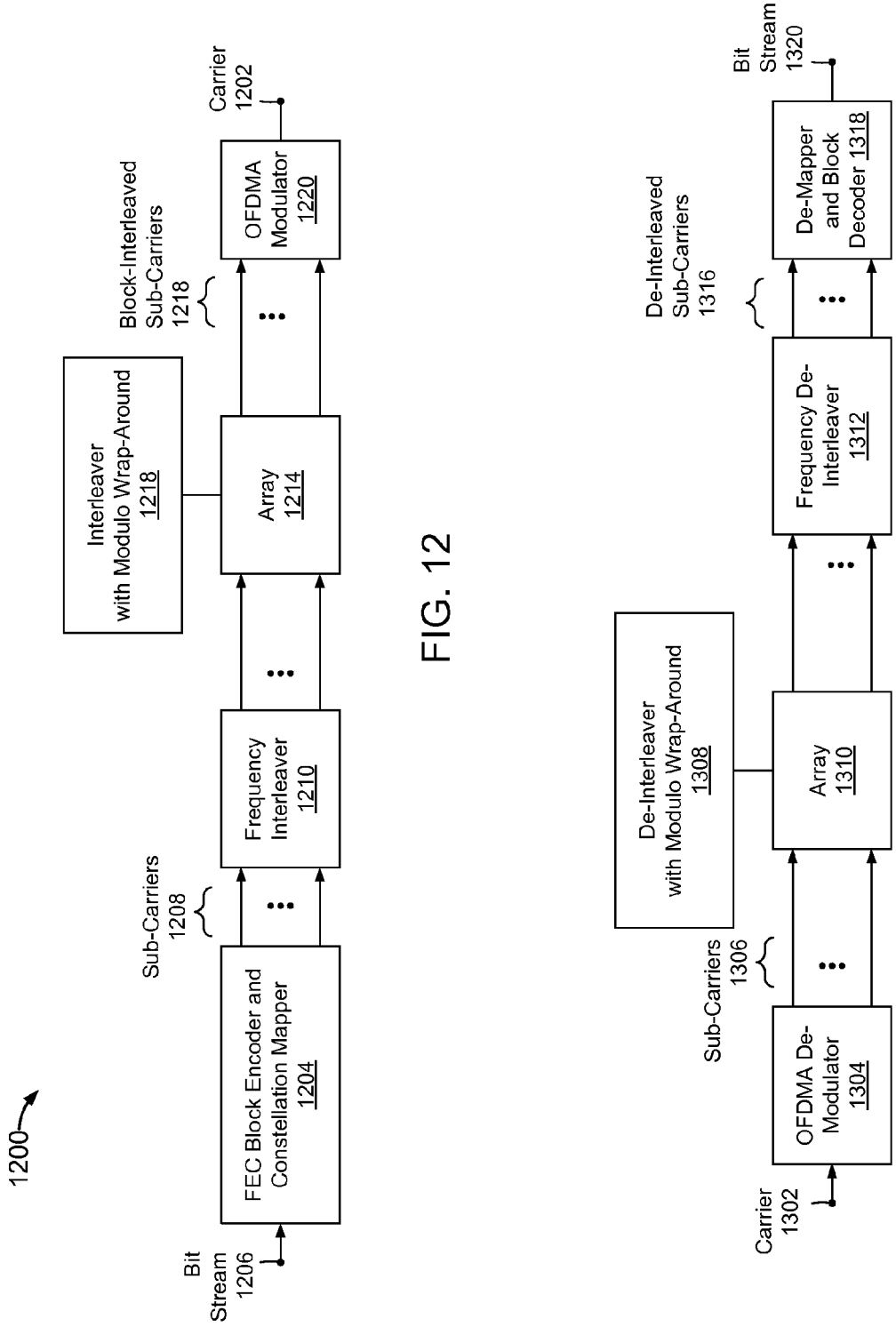

BLOCK-BASED TIME-FREQUENCY INTERLEAVING AND DE-INTERLEAVING

CROSS REFERENCE TO RELATED APPLICATIONS

This application claims the benefit of U.S. Provisional Patent Application No. 61/772,194, filed Mar. 4, 2013, which is incorporated herein by reference in its entirety.

TECHNICAL FIELD

Time interleaving, frequency interleaving, orthogonal frequency division multiplexing (OFDM), orthogonal frequency division multiple access (OFDMA).

BACKGROUND

A communication channel may introduce burst or broadband noise, ingress or narrowband noise, and/or multi-path distortion, which may impact the transmitted signals in different ways. Time interleaving may compensate for some channel effects. Frequency interleaving may compensate for other effects.

SUMMARY

Disclosed herein are methods and systems to interleave blocks of sub-carriers in time and time-frequency.

A block interleaver may process a block of sub-carriers as a two-dimensional array defined by a frequency dimension and a time dimension. For each symbol of the array a cell is selected at each frequency index of the array in a diagonal wrap-around fashion.

The array may be traversed with a modulo-based index computed as a function of an incrementing frequency index, a symbol index, and a modulus defined by a depth of the array.

Cells may be selected as indicated by the frequency and time indices, and/or as indicated by a bit-reversed representation of the frequency index and/or the time index.

A block interleaver may be configured to time interleave without impacting frequency, or interleave in time and frequency. Frequency interleaving may performed with the bit-reversed representation of the frequency index.

BRIEF DESCRIPTION OF THE DRAWINGS

FIG. 10 is a diagram of a sequence {x(i), i=0, 1, . . . , 31} arranged in a two-dimensional block or array, which may form part of an OFDMA frame.

FIG. 11 is a diagram of the array of FIG. 10 when accessed with bit-reversed addressing.

FIG. 12 is a block diagram of a transmit path that includes a modulo based block interleaver configurable as a time interleaver or a time-frequency interleaver.

FIG. 13 is a block diagram of a receive path that includes a modulo based block de-interleaver configurable as a time de-interleaver or a time-frequency de-interleaver.

Figure 1:
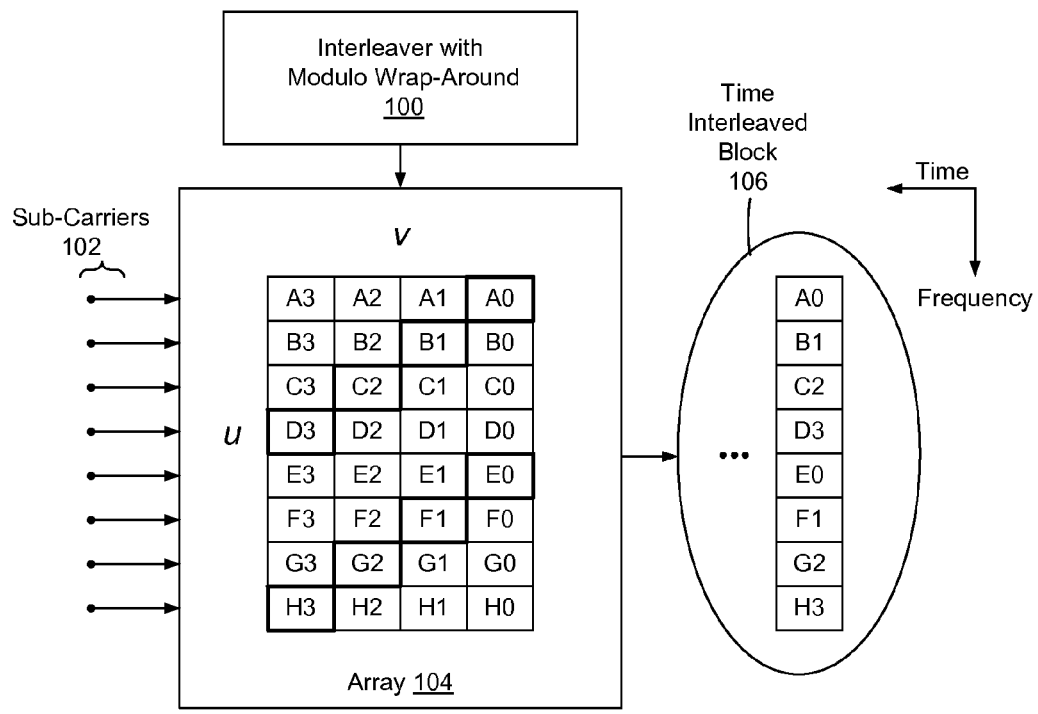
FIG. 1 is a block diagram of an interleaver to re-arrange or re-order segments of a block of sub-carriers in time and/or time-frequency based on a modulo wrap-around function.

In the drawings, the leftmost digit(s) of a reference number identifies the drawing in which the reference number first appears.

DETAILED DESCRIPTION

FIG. 1 is a block diagram of an interleaver 100 to re-arrange or re-order segments of a block of sub-carriers in time and/or time-frequency based on a modulo wrap-around function.

Interleaver 100 may be configured address or access a block of sub-carriers in an array format, illustrated here as an array 104 to receive a block of sub-carriers 102.

Array 104 includes cells arranged in rows and columns, and each row of cells is configured to receive a sequence of segments of a respective one of sub-carriers 102. Each segment of a sub-carrier may correspond to a symbol of the sub-carrier. Each column of array 104 may correspond to a symbol of a carrier to be modulated with sub-carriers 102.

In FIG. 1, array 104 is illustrated with four columns and eight rows. Array 104 is not, however, limited to this example.

Interleaver 100 may be configured as a time interleaver to re-order the segments within each row of array 104, while maintaining the segments of each row within the respective row, to provide a block of time interleaved sub-carriers. Interleaver 100 may, for example, be configured to output the segments of sub-carriers 102 in a wrapped diagonal fashion, as illustrated by a column of time interleaved sub-carrier block 106.

Interleaver 100 may be configured to time interleave sub-carriers 102 based on modular arithmetic, examples of which are provided below. In mathematics, modular arithmetic is a system of arithmetic for integers, where numbers "wrap around" upon reaching a certain value, referred to as the modulus.

Interleaver 100 may be configured as a time-frequency interleaver based on bit-reversed indexing of a frequency axis, such as described further below with reference to FIG. 8.

Figure 2:
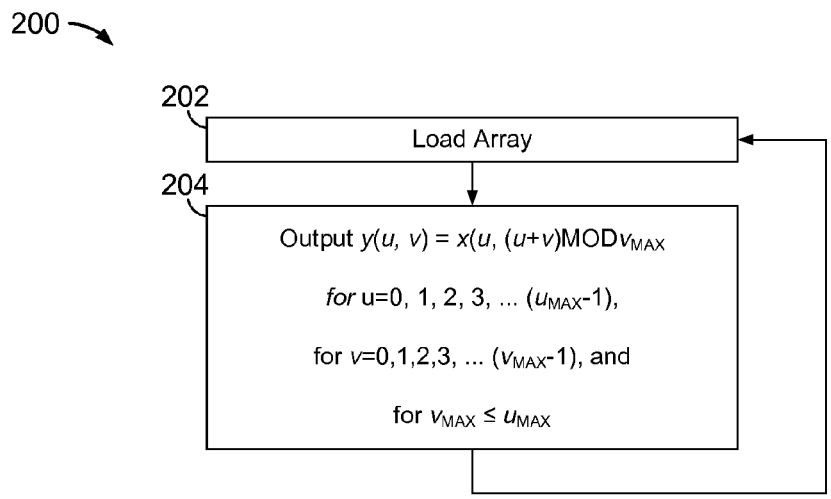
FIG. 2 is a flowchart of a method of time interleaving a block of sub-carriers based on a modulus defined by a depth of an array (e.g., the number of array columns).

FIG. 2 is a flowchart of a method 200 of time interleaving a block of sub-carriers based on a modulus defined by a depth of an array (e.g., the number of array columns). Method 200 is described below with reference to FIG. 3. Method 200 is not limited to the example of FIG. 3.

Figure 3:
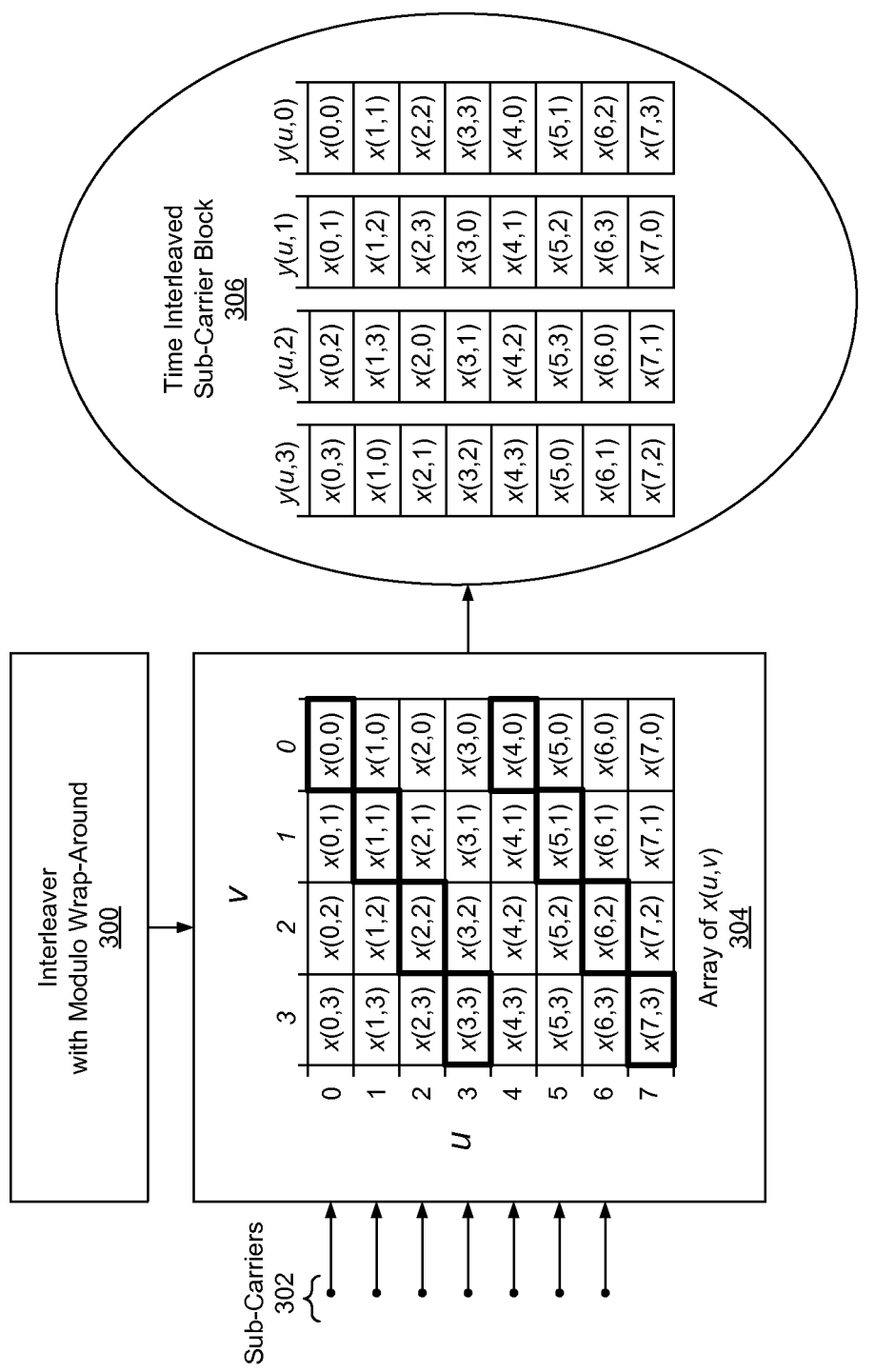
FIG. 3 is a block diagram of an interleaver configured to time interleave a block of sub-carriers arranged in an array.

FIG. 3 is a block diagram of an interleaver 300 configured to time interleave a block of sub-carriers 302 arranged in an array 304. Array 304 includes cells arranged in columns u and rows v. Cells of array 304 are denoted herein as x(u,v). In FIG. 3, array 304 includes eight columns and four rows. In this example, $u_{max}=8$ and $v_{max}=4$.

Interleaver 300 may be configured to provide a time interleaved sub-carrier block 306 based on a modulo defined by $v_{max}$. Array 304 is not limited to an 8 by 4 array. As another example, array 304 may be configured as a 32 by 8 array, and interleaver 300 may be considered to traverse array 304 with MOD8.

Figure 4:
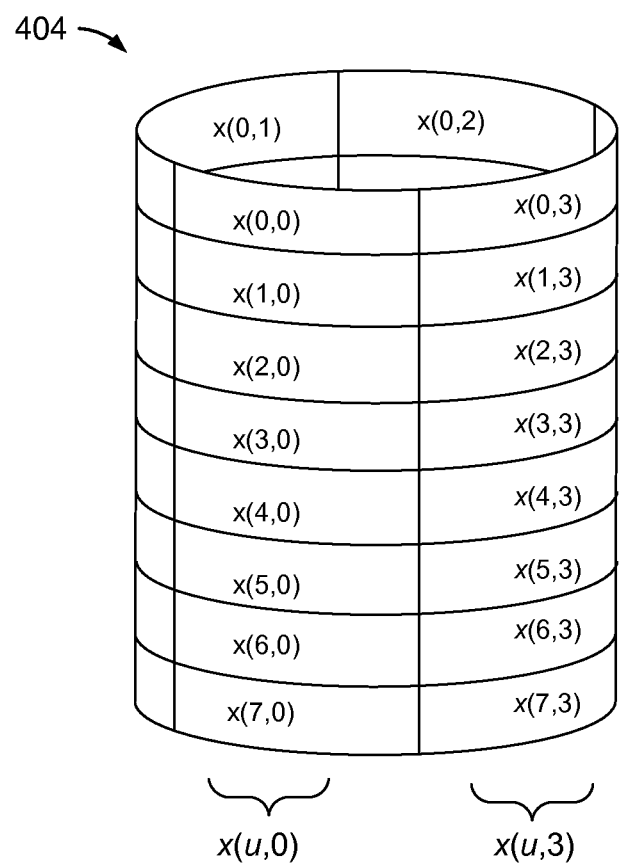
FIG. 4 is a block diagram of the array of FIG. 3 illustrated as a cylindrical array.

Interleaver 300 may be configured to treat array 304 as a cylindrical array in which columns x(u,0) and x(u,3) abut one another, an example of which is provided in FIG. 4. FIG. 4 is a block diagram of array 304, illustrated here as a cylindrical array 404 in which columns x(u,0) and x(u,3) abut one another.

Interleaver 300 is described below with reference to method 200 in FIG. 2 and with respect to a method 500 in FIG. 5. Interleaver 300 is not, however, limited to the examples of FIG. 2 or FIG. 5.

In FIG. 2, at 202, a u by v array is loaded with sub-carriers, such as described above with respect to FIG. 1. In FIG. 3, array 304 is loaded with sub-carriers 302.

At 204, y(u,v) is output as:

$$y(u,v)=x(u,(u+v)\text{MOD}v_{MAX}), \quad \text{EQ. (1)}$$

for u=0, 1, 2, . . . , ($u_{max}$−1), and
for v=0, 1, 2, . . . , ($v_{max}$−1),
where $v_{MAX} \leq u_{MAX}$ In EQ. (1), u may referred to as a frequency index, (u+v) MOD$v_{MAX}$ may be referred to as a time index, and v may be referred to as a symbol index.

In FIG. 3, where $v_{max}=4$, interleaver 300 may be configured to output y(u,v) as:

$$y(u,v)=x(u,(u+v)\text{MOD4}), \quad \text{EQ. (2)}$$

for u=0, 1, 2, . . . , 7, and
for v=0, 1, 2, and 3.

EQ. (1) and/or EQ. (2) may be implemented with positional notational incrementing of u and v, with u as the most significant bit and v as the least significant bit, and with radix of $u_{MAX}$, such as described below with reference to FIG. 5.

Figure 5:
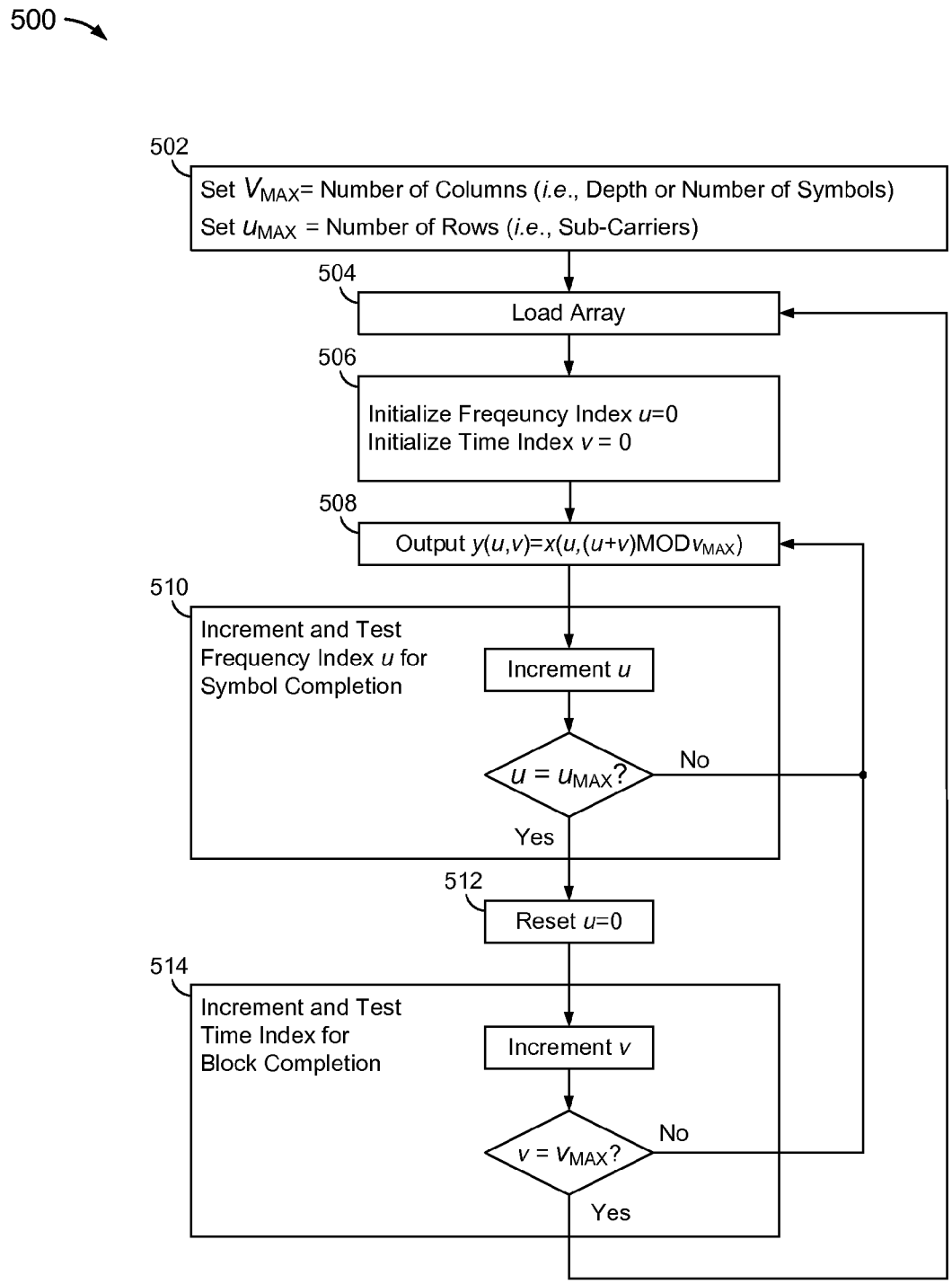
FIG. 5, is a flowchart of a method of time interleaving a block of sub-carriers based on a modulo wrap-around operation.

FIG. 5, is a flowchart of a method 500 of time interleaving a block of sub-carriers based on a modulo wrap-around operation. Method 500 is described below with reference to FIG. 3. Method 500 is not, however, limited to the example of FIG. 3.

At 502, an array is configured for a desired depth (i.e., $v_{MAX}$) and number of sub-carriers (i.e., $u_{MAX}$).

At 504, the array is loaded with sub-carriers.

At 506, a frequency index u and a symbol index v are initialized to zero.

At 508, $y(u,v)=x(u,(u+v)\text{MOD}v_{MAX})$ is output, based on current values of u and v.

At 510, frequency index u is incremented and tested with respect to $u_{MAX}$.

If frequency index u does not equal $u_{MAX}$, (e.g., if frequency index u is less than 8 in FIG. 3), processing returns to 508 to output $y(u,v)=x(u,(u+v)\text{MOD}v_{MAX})$ based on the frequency index u as incremented at 510.

If frequency index u equals $u_{MAX}$, (e.g., if frequency index u equals 8 in FIG. 3), outputting of y(u,v) at 508 is complete for a column y (i.e., for an OFDM/OFDMA carrier symbol). In this situation, frequency index u is reset to zero at 512, and processing proceeds to 514.

At 514, symbol index v is incremented and tested with respect to $v_{MAX}$.

If symbol index v does not equal $v_{MAX}$, (e.g., if symbol index v is less than 4 in FIG. 3), processing returns to 508 to output $y(u,v)=x(u,(u+v)\text{MOD}v_{MAX})$ based on frequency index u as reset at 512, and symbol index v as incremented at 514. Symbol index v is thus incremented upon completion of a symbol and is thus indicative of a symbol being processed. Symbol index v may also be referred to herein as a symbol count.

If symbol index v equals $v_{MAX}$, (e.g., if symbol index v equals 4 in FIG. 3), time interleaving is complete for the block of sub-carriers loaded at 504. In this situation, processing may return to 508 to re-load the array with another block of sub-carriers.

Table 1 below lists values or states of frequency index u, symbol index v, corresponding values of (u+v)MOD4, and corresponding outputs y(u,v), based on method 500 and the example of FIG. 3.

TABLE 1

| Iteration | Frequency index u | Symbol index v | (u + v) | (u + v)MOD4 | Output y(u, v) |
|---|---|---|---|---|---|
| 0 | 0 | 0 | 0 | 0 | y(0, 0) = x(0, 0) |
| 1 | 1 | 0 | 1 | 1 | y(1, 0) = x(1, 1) |
| 2 | 2 | 0 | 2 | 2 | y(2, 0) = x(2, 2) |
| 3 | 3 | 0 | 3 | 3 | y(3, 0) = x(3, 3) |
| 4 | 4 | 0 | 4 | 0 | y(4, 0) = x(4, 0) |
| 5 | 5 | 0 | 5 | 1 | y(5, 0) = x(5, 1) |
| 6 | 6 | 0 | 6 | 2 | y(6, 0) = x(6, 2) |
| 7 | 7 | 0 | 7 | 3 | y(7, 0) = x(7, 3) |
| 8 | 0 | 1 | 1 | 1 | y(0, 1) = x(0, 1) |
| 9 | 1 | 1 | 2 | 2 | y(1, 1) = x(1, 2) |
| 10 | 2 | 1 | 3 | 3 | y(2, 1) = x(2, 3) |
| 11 | 3 | 1 | 4 | 0 | y(3, 1) = x(3, 0) |
| 12 | 4 | 1 | 5 | 1 | y(4, 1) = x(4, 1) |
| 13 | 5 | 1 | 6 | 2 | y(5, 1) = x(5, 2) |
| 14 | 6 | 1 | 7 | 3 | y(6, 1) = x(6, 3) |
| 15 | 7 | 1 | 8 | 0 | y(7, 1) = x(7, 0) |
| 16 | 0 | 2 | 2 | 2 | y(0, 2) = x(0, 2) |
| 17 | 1 | 2 | 3 | 3 | y(1, 2) = x(1, 3) |
| 18 | 2 | 2 | 4 | 0 | y(2, 2) = x(2, 0) |
| 19 | 3 | 2 | 5 | 1 | y(3, 2) = x(3, 1) |
| 20 | 4 | 2 | 6 | 2 | y(4, 2) = x(4, 2) |
| 21 | 5 | 2 | 7 | 3 | y(5, 2) = x(5, 3) |
| 22 | 6 | 2 | 8 | 0 | y(6, 2) = x(6, 0) |
| 23 | 7 | 2 | 9 | 1 | y(7, 2) = x(7, 1) |
| 24 | 0 | 3 | 3 | 3 | y(0, 3) = x(0, 3) |
| 25 | 1 | 3 | 4 | 0 | y(1, 3) = x(1, 0) |
| 26 | 2 | 3 | 5 | 1 | y(2, 3) = x(2, 1) |
| 27 | 3 | 3 | 6 | 2 | y(3, 3) = x(3, 2) |
| 28 | 4 | 3 | 7 | 3 | y(4, 3) = x(4, 3) |
| 29 | 5 | 3 | 8 | 0 | y(5, 3) = x(5, 0) |
| 30 | 6 | 3 | 9 | 1 | y(6, 3) = x(6, 1) |
| 31 | 7 | 3 | 10 | 2 | y(7, 3) = x(7, 2) |

Time interleaving may include shifting or rotating rows of a cylindrical array relative to one another, such as described below with reference to FIGS. 6 and 7.

Figure 6:
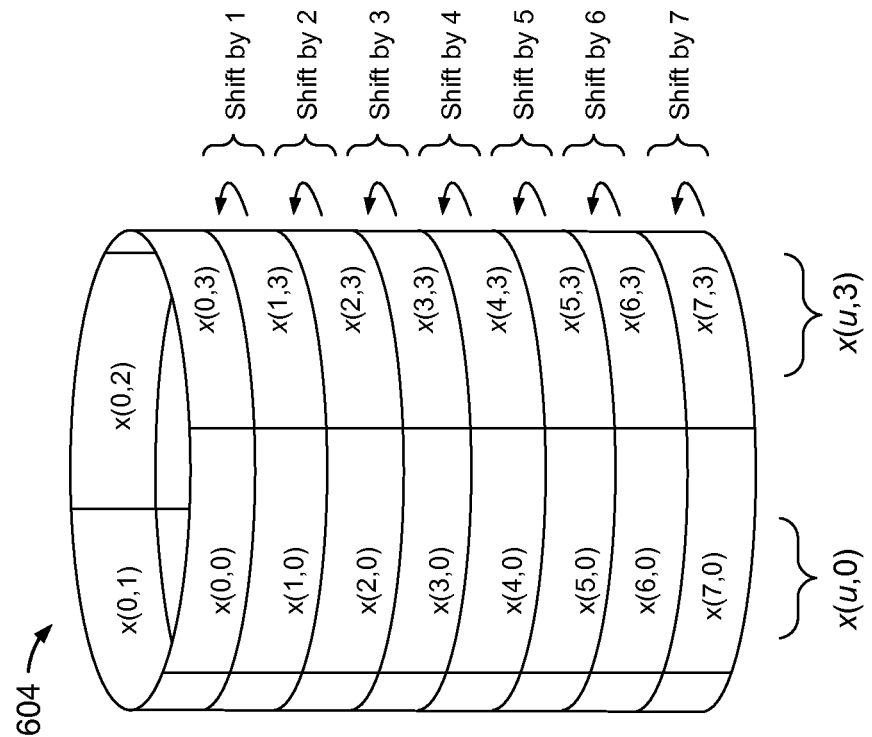
FIG. 6 is another block diagram of the array of FIG. 3 illustrated as a cylindrical array.

FIG. 6 is a block diagram of array 304, illustrated here as a cylindrical array 604, as in FIG. 4. Time interleaving may include shifting or rotating adjacent rows of array 604 relative to one another. In FIG. 6, row 1 is rotated by one cell relative to row 0, and each of rows 2 through 7 is rotated by a one more cell than the preceding row, to provide a time interleaved block of sub-carriers as illustrated in FIG. 7.

Figure 7:
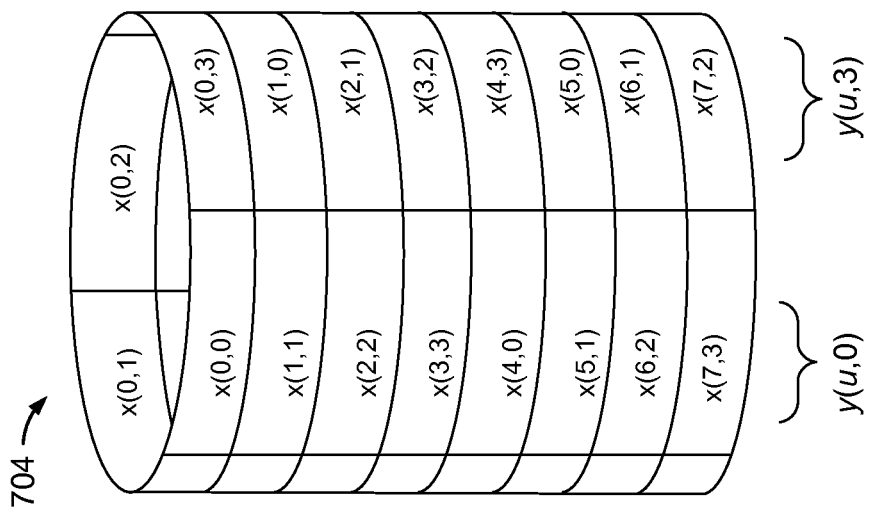
FIG. 7 is a block diagram of the array of FIG. 6 in which adjacent rows of the array are rotated relative to one another.

FIG. 7 is a block diagram of an array 304, illustrated here as a cylindrical array 704, in which adjacent rows of array 304 are shifted or rotated relative to one another as described above with respect to FIG. 6.

Methods and systems to time interleave, as disclosed herein, may be utilized with limited or no impact on frequency. This is illustrated in EQ. (1) where the frequency index u is the same on both sides of EQ. (1).

Methods and systems to time interleave, as disclosed herein, may be implemented alone and/or in combination with frequency interleaving. Time interleaving may be useful to address burst noise (i.e., broadband or wideband noise), and frequency interleaving may be useful for ingress (i.e., narrowband noise) protection and/or to address multi-path.

Broadband and narrowband noise have different characteristics in different communication systems. Time interleaving, as disclosed herein without bit-reversed addressing along the frequency dimension, may be useful to de-couple time and frequency interleaving from one another, which may be permit independent and/or more robust configuration, tailoring, and/or optimization of time and/or frequency interleaving based on corresponding issues or constraints (e.g., burst noise, latency, and/or ingress). For example, time interleaving depth may impact latency. De-coupling time and frequency interleaving from one another may permit selection of a minimum time interleaving depth without impacting frequency interleaving.

Burst noise may impact one or two consecutive columns of a received block of sub-carriers. Ingress noise may affect few consecutive rows of the block. Therefore, reading (or writing) diagonals of the block may provide immunity to burst noise and ingress noise because the impairments do not occur along diagonals. Bit reverse indexing, or addressing provides further immunity. For example, a noise burst may affect two consecutive columns. Bit-reversed addressing along the time dimension ensures that no consecutive subcarriers are read from (or written in) adjacent columns. A similar argument applies to bit-reversed addressing along the frequency dimension with respect to ingress noise that can impact several consecutive rows.

In FIG. 1, interleaver 100 may be configured to perform time-frequency interleaving with bit-reversed indexing along a frequency axis (i.e., along u). Bit-reversed indexing may be applied to the frequency axis, to the time axis, or to the frequency and time axes. When bit-reversed indexing is applied along the frequency axis, alone and/or in combination with bit-reversed indexing of the time axis, a block of sub-carriers is interleaved in both time and frequency.

Bit-reversed addressing in both time and frequency may provide an efficient way of performing time and frequency interleaving at the same time in OFDMA transmissions. To illustrate, if row-column interleaving is utilized instead, wherein data is written along rows and read along columns, or vice versa, burst interference affects columns and ingress interference affects rows. Row-column interleaving may thus be robust with respect to burst or ingress, but not to both at the same time. Diagonal techniques, as disclosed herein, may provide robustness to both types of interference. Bit-reversed addressing prevents the reading or writing of adjacent sub-carriers on consecutive rows or columns, and may thus provide additional immunity to interference.

Figure 8:
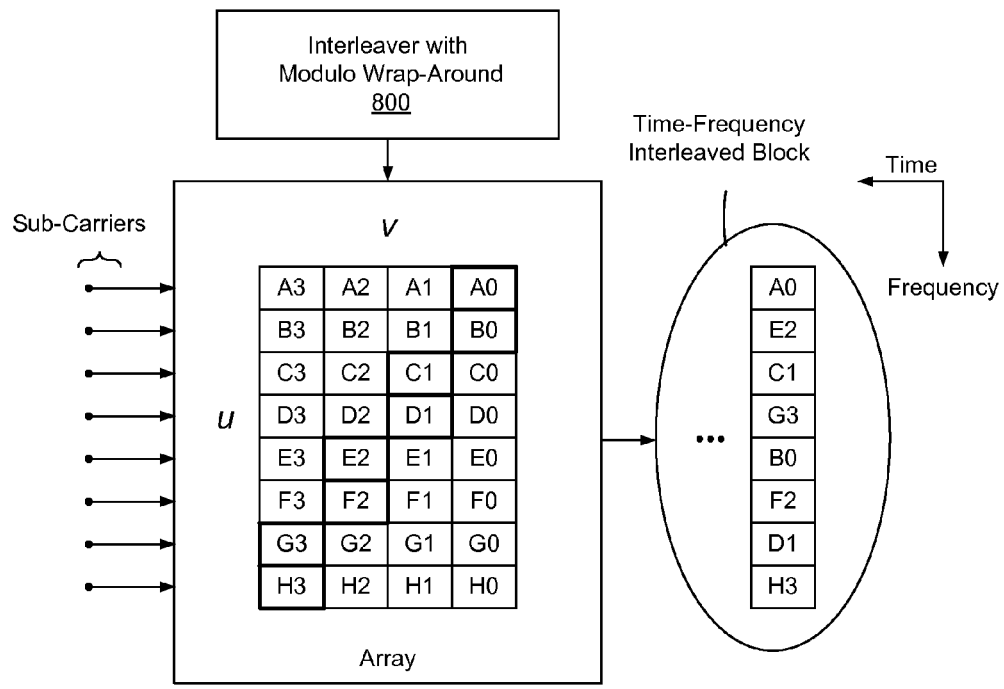
FIG. 8 is a block diagram of an interleaver configured as a time-frequency interleaver to address an array with bit-reversed indexing of a frequency axis.

FIG. 8 is a block diagram of an interleaver 800, configured to perform bit-reversed indexing of the frequency axis. In this embodiment, interleaver 800 is configured as a time-frequency interleaver.

Figure 9:
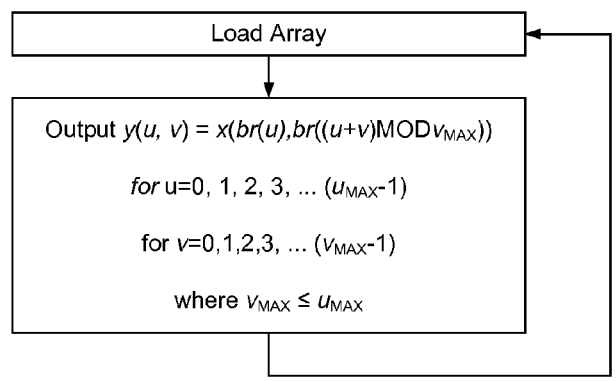
FIG. 9 is a flowchart of a method of time-frequency interleaving a block of sub-carriers based on a modulus defined by a depth of an array (e.g., the number of array columns), and based further on bit-reversed indexing along a frequency axis.

FIG. 9 is a flowchart of a method 900 of time-frequency interleaving a block of sub-carriers based on a modulus defined by a depth of an array (e.g., the number of array columns), and based on bit-reversed indexing along a frequency axis.

Interleaver 800 may be configured in accordance with method 900 to address rows and columns of an array in a bit-reversed order. For example, a first location to be addressed may be x(v,u)=(0, 0), and a second location to be addressed may be x(v,u)=(1, 1), which may be written in binary notation as x(v,u)=(01, 001). Two binary bits are used for the horizontal index v because there are only four columns in the example of FIG. 8. Three binary bits are used for the vertical index u because there are eight rows in the example of FIG. 8. x(v,u)=(01, 001) may be bit-reversed to provide br(x(v,u))=(10, 100). In this situation, using decimal notation, location (1,1) becomes (2,4). The next location may be x(2, 2) or, in binary, x(10, 010), which may be bit-reversed to provide x(1,2) in decimal. Bit-reversed ordering may be configured to increase and/or maximize a separation between successive samples x(i) while retaining a diagonal structure.

Table 2 below lists values or states for interleaver 800, based on method 900 and the example of FIG. 3.

TABLE 2

| | | | | Bit-Reversed Ordering | | | |
|---|---|---|---|---|---|---|---|
| No. | u | v | (u + v) | (u + v) MOD4 | br(u) | br((u + v)) MOD4 | Output y(u, v) |
| 0 | 0 | 0 | 0 | 0 | 0 | 0 | y(0, 0) = x(0, 0) |
| 1 | 1 | 0 | 1 | 1 | 4 | 2 | y(1, 0) = x(4, 2) |
| 2 | 2 | 0 | 2 | 2 | 2 | 1 | y(2, 0) = x(2, 1) |
| 3 | 3 | 0 | 3 | 3 | 6 | 3 | y(3, 0) = x(6, 3) |
| 4 | 4 | 0 | 4 | 0 | 1 | 0 | y(4, 0) = x(1, 0) |
| 5 | 5 | 0 | 5 | 1 | 5 | 2 | y(5, 0) = x(5, 2) |
| 6 | 6 | 0 | 6 | 2 | 3 | 1 | y(6, 0) = x(3, 1) |
| 7 | 7 | 0 | 7 | 3 | 7 | 3 | y(7, 0) = x(7, 3) |
| 8 | 0 | 1 | 1 | 1 | 0 | 2 | y(0, 1) = x(0, 2) |
| 9 | 1 | 1 | 2 | 2 | 4 | 1 | y(1, 1) = x(4, 1) |
| 10 | 2 | 1 | 3 | 3 | 2 | 3 | y(2, 1) = x(2, 3) |
| 11 | 3 | 1 | 4 | 0 | 6 | 0 | y(3, 1) = x(6, 0) |
| 12 | 4 | 1 | 5 | 1 | 1 | 2 | y(4, 1) = x(1, 2) |
| 13 | 5 | 1 | 6 | 2 | 5 | 1 | y(5, 1) = x(5, 1) |
| 14 | 6 | 1 | 7 | 3 | 3 | 3 | y(6, 1) = x(3, 3) |
| 15 | 7 | 1 | 8 | 0 | 7 | 0 | y(7, 1) = x(7, 0) |
| 16 | 0 | 2 | 2 | 2 | 0 | 1 | y(0, 2) = x(0, 1) |
| 17 | 1 | 2 | 3 | 3 | 4 | 3 | y(1, 2) = x(4, 3) |
| 18 | 2 | 2 | 4 | 0 | 2 | 0 | y(2, 2) = x(2, 0) |
| 19 | 3 | 2 | 5 | 1 | 6 | 2 | y(3, 2) = x(6, 2) |
| 20 | 4 | 2 | 6 | 2 | 1 | 1 | y(4, 2) = x(1, 1) |
| 21 | 5 | 2 | 7 | 3 | 5 | 3 | y(5, 2) = x(5, 3) |
| 22 | 6 | 2 | 8 | 0 | 3 | 0 | y(6, 2) = x(3, 0) |
| 23 | 7 | 2 | 9 | 1 | 7 | 2 | y(7, 2) = x(7, 2) |
| 24 | 0 | 3 | 3 | 3 | 0 | 3 | y(0, 3) = x(0, 3) |
| 25 | 1 | 3 | 4 | 0 | 4 | 0 | y(1, 3) = x(4, 0) |
| 26 | 2 | 3 | 5 | 1 | 2 | 2 | y(2, 3) = x(2, 2) |
| 27 | 3 | 3 | 6 | 2 | 6 | 1 | y(3, 3) = x(6, 1) |
| 28 | 4 | 3 | 7 | 3 | 1 | 3 | y(4, 3) = x(1, 3) |
| 29 | 5 | 3 | 8 | 0 | 5 | 0 | y(5, 3) = x(5, 0) |
| 30 | 6 | 3 | 9 | 1 | 3 | 2 | y(6, 3) = x(3, 2) |
| 31 | 7 | 3 | 10 | 2 | 7 | 1 | y(7, 3) = x(7, 1) |

Table 2 illustrates bit-reversed addressing when time and frequency dimensions of an array are powers of 2. For a dimension other than a power of 2, bit-reversed addressing may configured based on a next highest power of 2.

Another example of bit-reversed access is provided with reference to FIGS. 10 and 11.

FIG. 10 is a diagram of a sequence {x(i), i=0, 1, . . . , 31} arranged in a two-dimensional block or array 1000. Block 1000 may form part of an OFDMA frame. Each vertical column of block 110 may form part of an OFDMA symbol. In this example, the vertical dimension is labelled frequency and the horizontal dimension is labelled time. With bit-reversed addressing, block 1000 takes the form of a block 1100 in FIG. 11.

An interleaver as disclosed herein (i.e., a time and/or time-frequency interleaver), and/or a corresponding de-interleaver, may be configured as a part of a transceiver, such as described below with reference to FIG. 12 and/or FIG. 13.

FIG. 12 is a block diagram of a transmit path 1200 that includes a modulo based an interleaver configurable as a time interleaver or a time-frequency interleaver.

Transmit path 1200 may be configured to modulate a carrier 1202 with orthogonal frequency division multiplexing (OFDM) and/or orthogonal frequency division multiple access (OFDMA). Methods and system disclosed herein are not, however, limited to OFDM or OFDMA.

Transmit path 1200 includes a forward error correction (FEC) block encoder and constellation mapper (module) 1204 to encode a bit stream 1206 and map the encoded bit stream to multiple sub-carriers 1208.

Module 1204 may include, without limitation, a BCH outer encoder and/or a low-density parity-check (LDPC) inner encoder. The acronym BCH is based on names of mathematicians Alexis Hocquenghem, Raj Bose, and D. K. Ray-Chaudhuri.

Module 1204 may be configured to map the encoded bit stream to sub-carriers 1208 with quadrature amplitude modulation (QAM). Module 1204 is not, however, limited to QAM.

Transmit path 1200 further includes a interleaver 1218 to interleave blocks of sub-carriers within an array 1214 in time or time and frequency, such as described in one or more examples herein. Where interleaver 1218 is configured as a time interleaver, transmit path 1200 may further include a frequency interleaver 1210.

Transmit path 1200 further includes a modulator 1220, illustrated here as an OFDMA modulator, to modulate carrier 1202 with block-interleaved sub-carriers 1218. Modulator 1220 may include an Inverse Fast Fourier Transform (IFFT) module.

Carrier 1202 may be converted to an analog signal and frequency up-converted to a suitable carrier frequency. This up-converted carrier is then transmitted over or through a channel, which may include a wired (e.g., coaxial cable) and/or wireless channel.

FIG. 13 is a block diagram of a receive path 1300 that includes a modulo based de-interleaver 1308 to de-interleave blocks of sub-carriers within an array 1310. De-interleaver 1308 may be configured as a time de-interleaver or a time-frequency de-interleaver, and may be configured to perform an inverse of an operation performed by interleaver 1218 in FIG. 12. Where de-interleaver 1308 is configured as a time de-interleaver, receive path 1300 may further include a frequency de-interleaver 1312.

Receive path 1300 further includes a de-mapper and block decoder (module) 1318 to de-map and decode symbols of de-interleaved sub-carriers 1316. Module 1318 may include a least likelihood ratio (LLR) de-mapper to generate LLRs for bits of codewords modulated on the sub-carriers. Module 1318 may further include an FEC block decoder (e.g., an LDPC block decoder) to decode a bit stream 1320 based on the LLRs.

An example is provided below in which transmit path 1200 is configured to map 32 sub-carriers 1208 to form part of an OFDMA symbol. The OFDMA symbol may be shared with one or more other transmit paths. For example, the OFDMA symbol may include 1024 sub-carriers, which may be distributed amongst 32 transmitters.

In this example, interleaver 1218 may be configured to shuffle sub-carriers 1208 in the frequency dimension or domain, within the 32 sub-carriers of the OFDM symbol.

Interleaver 1218 may also change the time location of the carriers (i.e., to move a carrier from one symbol to another), without change to the frequency dimension. For an array depth of 12, 12 symbols are collected in array 1214 prior to time interleaving.

Modulator 1220 may be configured to provide OFDMA burst transmissions.

A channel may introduce various effects (e.g., distortion and additive noise), which may result in bit errors with receive path 1300. Burst noise is akin to impulses, and may be caused by various electrical switching effects. When a Fast Fourier Transform (FFT) is performed on a received OFDM or OFDMA carrier (e.g., within demodulator 1304), impulse noise may be distributed over all of sub-carriers 1306 of a symbol, which may corrupt multiple ones of sub-carriers 1306.

Further to the example above, sub-carriers 1306 may include 32 sub-carriers, and array 1310 may be configured to process blocks of 12 OFDMA symbols, corresponding to 32×8 data blocks. If an impulse or burst results in corruption of 1 of the 12 OFDM symbols of a data block, time de-interleaver 1308 distributes the 32 corrupted sub-carriers of the corrupted symbol amongst all 12 symbols of the data block.

Where module 1308 include a LLR de-mapper, distribution of corrupted carriers of a symbol over multiple symbols will distribute the burst errors over multiple FEC blocks (e.g., LDPC blocks), which will permit a FEC block decoder (e.g., an LDPC block decoder), to correct for the burst errors.

One or more features disclosed herein may be implemented in, without limitation, circuitry, a machine, a computer system, a processor and memory, a computer program encoded within a computer-readable medium, and/or combinations thereof. Circuitry may include discrete and/or integrated circuitry, application specific integrated circuitry (ASIC), a system-on-a-chip (SOC), and combinations thereof. Information processing by software may be concretely realized by using hardware resources.

One or more features disclosed herein may be implemented in, without limitation, circuitry, a machine, a computer system, a processor and memory, a computer program encoded within a computer-readable medium, and/or combinations thereof. Circuitry may include discrete and/or integrated circuitry, application specific integrated circuitry (ASIC), a system-on-a-chip (SOC), and combinations thereof. Information processing by software may be concretely realized by using hardware resources.

Figure 14:
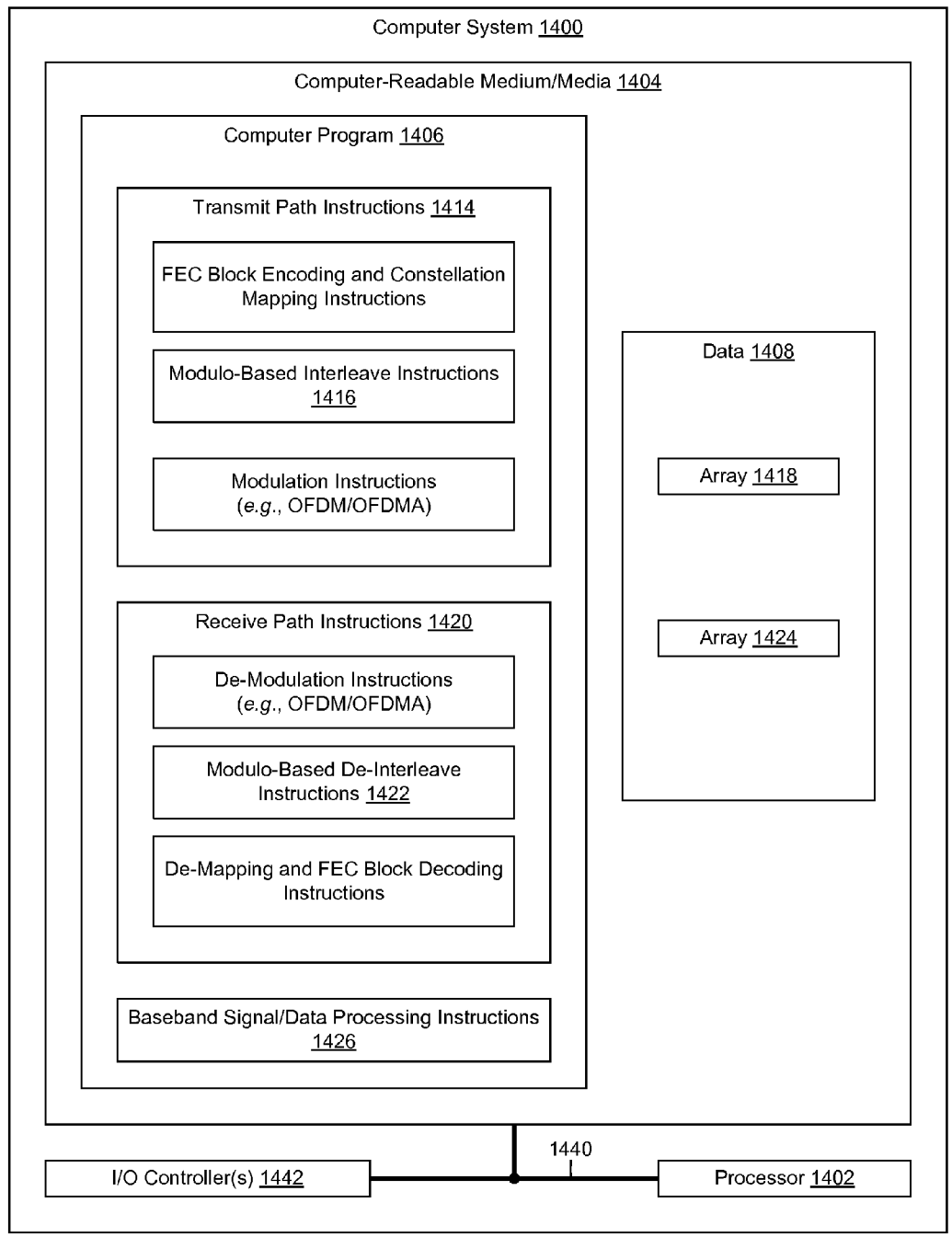
FIG. 14 is a block diagram of a computer system configured to interleave a block of sub-carriers, in time or in time and frequency, based on a modulo wrap around function and a modulus defined by a depth of block of sub-carriers.

FIG. 14 is a block diagram of a computer system 1400, configured to interleave a block of sub-carriers, in time or in time and frequency, based on a modulo wrap around operation and a modulus defined by a depth of block of sub-carriers.

Computer system 1400 includes one or more processors, illustrated here as a processor 1402, to execute instructions of a computer program 1406 encoded within a computer readable medium 1404.

Processor 1402 may include one or more instruction processors and/or processor cores, and may include a microprocessor, a graphics processor, a physics processor, a digital signal processor, a network processor, a front-end communications processor, a co-processor, a management engine (ME), a controller or microcontroller, a central processing unit (CPU), a general purpose instruction processor, and/or an application-specific processor.

Processor 1402 may further include a control unit to interface between the instruction processor(s)/core(s) and computer readable medium 1404.

Computer readable medium 1404 may include a transitory or non-transitory computer-readable medium, and may include, without limitation, registers, cache, and/or memory.

Computer-readable medium 1404 may include data 1408 to be used by processor 1402 during execution of computer program 1406 and/or generated by processor 1402 during execution of computer program 1406.

In the example of FIG. 14, computer program 1406 includes transmit path instructions 1414 to cause processor 1402 to modulate a carrier based on multiple sub-carriers. Transmit path instructions 1414 include modulo-based block interleave instructions 1416 to cause processor 1402 to time interleave or time-frequency interleave an array 1418 or block of sub-carriers, such as described in one or more examples herein.

Computer program 1406 further includes receive path instructions 1420 to cause processor 1402 to demodulate sub-carriers of a receive carrier, and de-map and decode bits modulated on the sub-carriers. Receive path instructions 14120 include modulo-based de-interleave instructions 1422 to cause processor 1402 to time de-interleave or time-frequency de-interleave an array 1424 or block of demodulated sub-carriers, such as described in one or more examples herein.

Computer program 1406 may further includes baseband and/or data processing instructions 1426 to provide a bit stream for processing with transmit path instructions 1414 and/or to process a bit stream demodulated with receive path instructions 1420.

Computer system 1400 further includes communications infrastructure 1440 to communicate amongst devices and/or resources of computer system 1400.

Computer system 1400 further includes one or more input/output (I/O) devices and/or controllers 1442 to interface with one or more other systems, such as a communication channel or medium.

Methods and systems disclosed herein may be implemented with respect to one or more of a variety of systems, such as described below with reference to FIG. 15. Methods and systems disclosed herein are not, however, limited to the examples of FIG. 15.

Figure 15:
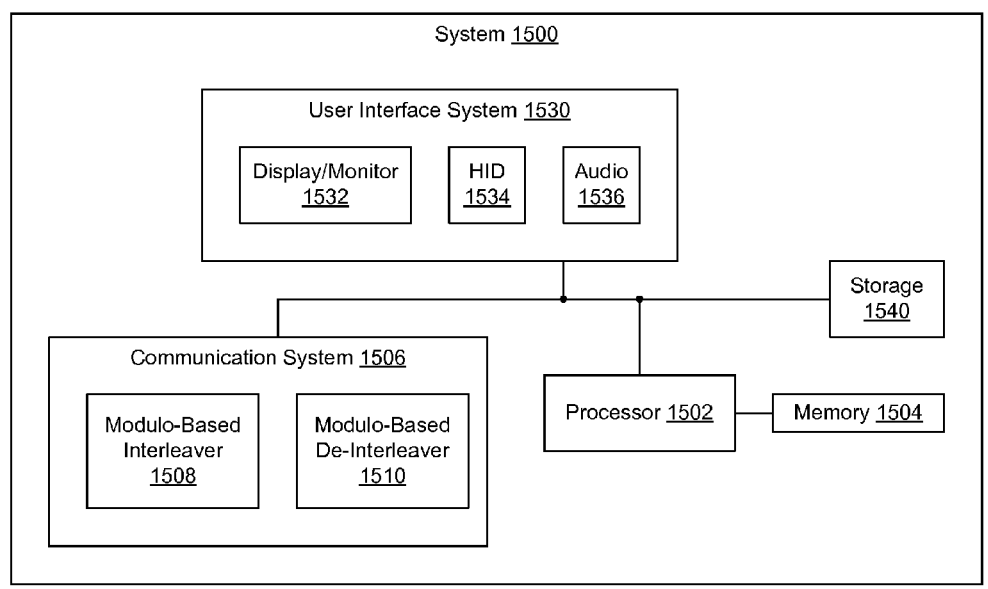
FIG. 15 is a block diagram of a system that includes a processor and memory, a user interface system, and a communication system that includes an interleaver configurable as a time interleaver or time-frequency interleaver, and a de-interleaver configurable as a time de-interleaver or time-frequency de-interleaver.

FIG. 15 is a block diagram of a system 1500, including a processor 1502 and memory, cache, registers, and/or other computer-readable medium, collectively referred to herein as memory 1504. System 1500 further includes a communication system 1506 and a user interface system 1530. System 1500 may further include an electronic or computer-readable storage medium (storage) 1540, which may be accessible to processor 1502, communication system 1506, and/or user interface system 1530.

Communication system 1506 may include an interleaver 1508 and/or a de-interleaver 1510, such as described in one or examples herein.

Communication system 1506 may be configured to communicate with an external communication network on behalf of processor 1502 and/or user interface system 1530. The external network may include a voice network (e.g., a wireless telephone network), and/or a data or packet-based network (e.g., a proprietary network and/or the Internet), such as a digital video broadcast (e.g., over cable) network.

Communication system 1506 may include a wired (e.g., cable) and/or wireless communication system, and may be configured in accordance with one or more digital video broadcast standards.

User interface system 1530 may include a monitor or display 1532 and/or a human interface device (HID) 1534. HID 1534 may include, without limitation, a key board, a cursor device, a touch-sensitive device, a motion and/or image sensor, a physical device and/or a virtual device, such as a monitor-displayed virtual keyboard. User interface system 1530 may include an audio system 1536, which may include a microphone and/or a speaker.

System 1500 and/or communication system 1506 may be configured as a stationary or portable/hand-held system, and may be configured as, for example, a mobile telephone, a set-top box, a gaming device, and/or a rack-mountable, desktop, lap-top, notebook, net-book, note-pad, or tablet system, and/or other conventional and/or future-developed system(s). System 1500 is not, however, limited to these examples.

System 1500 or portions thereof may be implemented within one or more integrated circuit dies, and may be implemented as a system-on-a-chip (SoC).

EXAMPLES

The following examples pertain to further embodiments.

Example 1 is an apparatus that includes a block interleaver to process a block of sub-carriers as a two-dimensional array defined by a frequency dimension and a time dimension, wherein for each symbol of the array the block interleaver is configured to select a cell at each frequency index of the array in a diagonal wrap-around fashion.

In an Example 2, for each symbol of the block of sub-carriers the block interleaver is further configured to select a cell at each frequency index in a frequency-sequential manner to interleave the block of sub-carriers in time and maintain a frequency-order of the block of sub-carriers.

In an Example 3, for each symbol of the block of sub-carriers the block interleaver is further configured to increment the frequency index over a frequency dimension of the array, compute a time index based on the frequency index, a symbol index, and a modulus defined by a depth of the array in terms of symbols, and select a cell at each frequency index based on the time index.

In an Example 4, for each symbol of the block of sub-carriers the block interleaver is further configured to select a cell at each frequency index as indicated by the frequency and time indices to interleave the block of sub-carriers in time and maintain a frequency-order of the block of sub-carriers.

In an Example 5, for each symbol of the block of sub-carriers the block interleaver is further configured to select a cell at each frequency index based on a bit-reversed representation of the frequency index to interleave the sub-carriers frequency.

In an Example 6, for each symbol of the block of sub-carriers the block interleaver is further configured to select a cell at each frequency index based further on a bit-reversed representation of the time index.

In an Example 7, the block interleaver is further configured to increment the frequency index and the symbol index based on positional notational counting, with the frequency index as a most significant bit and a radix defined by a number of a range of the frequency index.

In an Example 8, the block interleaver is further configured to arrange cells $x(u,v)$ of the block of sub-carriers as an array of cells $y(u,v)$, where, $$y(u,v) = x(u,(u+v) \mathrm{MOD} v\mathrm{MAX}),$$

u is the frequency index, v is the symbol index, and $(u+v)\mathrm{MOD}v\mathrm{MAX}$ is the time index.

In an Example 9, Example further includes a transmitter, wherein the transmitter includes:

a forward error correction (FEC) block encoder to block-encode a bit stream;

a constellation mapper to map the FEC encoded data blocks over blocks of sub-carriers;

the block interleaver to process the blocks of sub-carriers; and a modulator to modulate a carrier with the sub-carriers.

In an Example 10, Example 9 further includes a receiver, wherein the receiver includes:

a demodulator to demodulate sub-carriers from a receive carrier;

a block de-interleaver to process a block of the demodulated sub-carriers as a two-dimensional array defined by a frequency dimension and a time dimension, wherein for each symbol of the array the block de-interleaver is configured to select a cell at each frequency index of the array in a diagonal wrap-around fashion;

a log likelihood ratio (LLR) de-mapper to generate LLRs for codewords of each of the demodulated sub-carriers within each symbol of the block; and a block decoder to decode a bit stream based on the LLRs.

An Example 11 is a system that includes a processor and memory, and a communication system to interface with a communication network and one or more of the processor and a user interface system, wherein the communication system includes a block interleaver to process a block of sub-carriers as a two-dimensional array defined by a frequency dimension and a time dimension, wherein for each symbol of the array the block interleaver is configured to select a cell at each frequency index of the array in a diagonal wrap-around fashion.

In an Example 12, the system of Example 11 is configured as a cable modem to communicate over a coaxial cable.

An Example 13 is a method that includes processing a block of sub-carriers as a two-dimensional array defined by a frequency dimension and a time dimension including, for each symbol of the array, selecting a cell at each frequency index of the array in a diagonal wrap-around fashion.

In an Example 14, the method further includes, for each symbol of the block of sub-carriers, selecting a cell at each frequency index in a frequency-sequential manner to interleave the block of sub-carriers in time and maintain a frequency-order of the block of sub-carriers.

In an Example 15, the method further includes, for each symbol of the block of sub-carriers incrementing the frequency index over a frequency dimension of the array, computing a time index based on the frequency index, a symbol index, and a modulus defined by a depth of the array in terms of symbols, and selecting a cell at each frequency index based on the time index.

In an Example 16, the method further includes, for each symbol the block of sub-carriers, selecting a cell at each frequency index as indicated by the frequency and time indices to interleave the block of sub-carriers in time and maintain a frequency-order of the block of sub-carriers.

In an Example 17, the method further includes, for each symbol the block of sub-carriers, selecting a cell at each frequency index based on a bit-reversed representation of the frequency index to interleave the sub-carriers frequency.

In an Example 18, the method further includes, for each symbol the block of sub-carriers, selecting a cell at each frequency index based further on a bit-reversed representation of the time index.

In an Example 19, the method further includes incrementing the frequency index and the symbol index based on positional notational counting, with the frequency index as a most significant bit and a radix defined by a number of a range of the frequency index.

In an Example 20, the method further includes arranging cells x(u,v) of the block of sub-carriers as an array of cells y(u,v), where, $$y(u,v)=x(u,(u+v)\text{MOD}v_{MAX}),$$

u is the frequency index, v is the symbol index, and $(u+v)\text{MOD}v_{MAX}$ is the time index.

In an Example 21, the method further includes:

encoding a bit stream with a forward error correction (FEC) block encoding codes scheme;

mapping FEC encoded data blocks over blocks of sub-carriers;

processing a block of the sub-carriers mapped with the FEC encoded data blocks as the two-dimensional array and, for each symbol of the array, select a cell at each frequency index of the array in a diagonal wrap-around fashion; and modulating a carrier with the sub-carriers.

In an Example 22, the method further includes:

demodulating sub-carriers of a receive carrier; and processing a block of the demodulated sub-carriers as a two-dimensional array defined by a frequency dimension and a time dimension and, for each symbol of the array the block de-interleaver, select a cell at each frequency index of the array in a diagonal wrap-around fashion;

computing LLRs for codewords of each of the demodulated sub-carriers within each symbol of the block; and block-decoding a bit stream based on the LLRs.

An Example 23 is a machine readable medium comprising a plurality of instructions that in response to being executed on a computing device, cause the computing device to carry out a method according to any one of Examples 13-22.

An Example 24 is a communications device arranged to perform the method of any one of claims 13-22.

An Example 25 is an apparatus to compute a device location, configured to perform the method of any one of the claims 13-22.

An Example 26 is a computer system to perform the method of any of claims 13-22.

An Example 27 is a machine to perform the method of any of claims 13-22.

An Example 28 is an apparatus comprising means for performing the method of any one of claims 13-22.

An Example 29 is a computing device comprising a chipset according to any one of the claims 13-22 and memory to compute a device location.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed. While various embodiments are disclosed herein, it should be understood that they are presented as examples. The scope of the claims should not be limited by any of the example embodiments disclosed herein.

What is claimed is:

1. An apparatus, comprising, a radio frequency transmitter that includes:

a constellation mapper to map bits to symbols of multiple sub-carriers;

a block interleaver to interleave a block of v symbols of the sub-carriers, including to shift the v symbols of a first one of the sub-carriers by a predetermined number of symbols relative to the v symbols of a second one of the sub-carriers in a wrap-around fashion and shift the v symbols of remaining ones of the sub-carriers by the predetermined number of symbols relative to the v symbols of respective other ones of the of the sub-carriers in the wrap-around fashion, wherein v is an integer; and a modulator to modulate the interleaved block.

2. The apparatus of claim 1, wherein the block interleaver is further configured to:

time-interleave the block of v symbols of the sub-carriers, and maintain frequency assignments of the v symbols of the sub-carriers.

3. The apparatus of claim 2, wherein the first sub-carrier is adjacent and subsequent to the second sub-carrier with respect to frequency, and wherein block interleaver is further configured to:

shift the v symbols of each remaining sub-carrier by the predetermined number of symbols relative to the v symbols of a respective preceding one of the sub-carriers in the wrap-around fashion.

4. The apparatus of claim 1, wherein the block interleaver is further configured to, for a first symbol of the block:

sequentially select one of the v symbols of each of the sub-carriers based on a sub-carrier count and a symbol count;

increment the sub-carrier count and the symbol count for each selected symbol of a sub-carrier;

reset the symbol count when the symbol count reaches v; and reset the sub-carrier count and process a second symbol of the block when the sub-carrier count reaches a number of the sub-carriers.

5. The apparatus of claim 4, wherein the block interleaver is further configured to, for each symbol of the block:

sequentially select the sub-carriers based on the sub-carrier count, and select one of the v symbols of each selected sub-carrier based on a sum of the sub-carrier count and the symbol count.

6. The apparatus of claim 4, wherein the block interleaver is further configured to:

interleave the block of v symbols of the sub-carriers in time and frequency.

7. The apparatus of claim 6, wherein the block interleaver is further configured to, for each symbol of the block:

reverse each bit of the sub-carrier count to provide a bit-reversed sub-carrier count;

reverse each bit of the sum of the sub-carrier count and the symbol count to provide a bit-reversed sum; and sequentially select the sub-carriers based on the bit reversed the sub-carrier count, and select one of the v symbols of each selected sub-carrier based on the bit-reversed sum.

8. The apparatus of claim 1, wherein the block interleaver is further configured to:

arrange the v symbols of the sub-carriers as an array of respective cells in accordance with, $$y(p,q) = x(p,(p+q) \bmod v), \text{ where,}$$

$y(p,q)$ is a cell at $p^{th}$ row of a $q^{th}$ column of the array, $p$ is a sub-carrier count, $q$ is a symbol count, $x(p,(p+q) \bmod v)$ represents a $(p+q)^{th}$ one of the v symbols of a $p^{th}$ one of the subcarriers, and MODv represents a modulus wrap-around operation to increment p and q upon each determination of $y(p,q)$, and to reset q when q reaches v, until $y(p,q)$ is determined for all of the v symbols of the subcarriers.

9. The apparatus of claim 1, further including a receiver that includes:

a demodulator to demodulate sub-carriers of a received carrier; and a block de-interleaver to de-interleave a block of v symbols of the demodulated sub-carriers, including to shift the v symbols of a first one of the demodulated sub-carriers by the predetermined number of symbols relative to the v symbols of a second one of the demodulated sub-carriers in the wrap-around fashion and shift the v symbols of remaining ones of the demodulated sub-carriers by the predetermined number of symbols relative to the v symbols of respective other ones of the of the demodulated sub-carriers in the wrap-around fashion;

a log likelihood ratio (LLR) de-mapper to generate LLRs for codewords based on the de-interleaved block; and a block decoder to decode a bit stream based on the LLRs.

10. A non-transitory computer-readable medium encoded with a computer program, including instructions to cause a processor to map bits to symbols of multiple sub-carriers;

interleave a block of v symbols of the sub-carriers, including to shift the v symbols of a first one of the sub-carriers by a predetermined number of symbols relative to the v symbols of a second one of the sub-carriers in a wrap-around fashion and shift the v symbols of remaining ones of the sub-carriers by the predetermined number of symbols relative to the v symbols of respective other ones of the of the sub-carriers in the wrap-around fashion, wherein v is an integer; and provide the block of interleaved block to a modulator.

11. The non-transitory computer-readable medium of claim 10, further including instructions to cause the processor to:

time-interleave the block of v symbols, and maintain frequency assignments of the v symbols of the sub-carriers.

12. The non-transitory computer-readable medium of claim 11, first sub-carrier is adjacent and subsequent to the second sub-carrier with respect to frequency, further including instructions to cause the processor to:

shift the v symbols of each remaining sub-carrier by the predetermined number of symbols relative to the v symbols of a respective preceding one of the sub-carriers in the wrap-around fashion.

13. The non-transitory computer-readable medium of claim 11, further including instructions to cause the processor to, for a first symbol of the block:

sequentially select one of the v symbols of each of the sub-carriers based on a sub-carrier count and a symbol count;

increment the sub-carrier count and the symbol count for each selected symbol of a sub-carrier;

reset the symbol count when the symbol count reaches v; and reset the sub-carrier count and process a second symbol of the block when the sub-carrier count reaches a number of the sub-carriers.

14. The non-transitory computer-readable medium of claim 13, further including instructions to cause the processor to, for each symbol of the block:

sequentially select the sub-carriers based on the sub-carrier count, and select one of the v symbols of each selected sub-carrier based on a sum of the sub-carrier count and the symbol count.

15. The non-transitory computer-readable medium of claim 14, further including instructions to cause the processor to:
interleave the block of v symbols of the sub-carriers in time and frequency.

16. The non-transitory computer-readable medium of claim 15, further including instructions to cause the processor to, for each symbol of the block:
reverse each bit of the sub-carrier count to provide a bit-reversed sub-carrier count;
reverse each bit of the sum of the sub-carrier count and the symbol count to provide a bit-reversed sum; and
sequentially select the sub-carriers based on the bit reversed the sub-carrier count, and select one of the v symbols of each selected sub-carrier based on the bit-reversed sum.

17. The non-transitory computer-readable medium of claim 10, further including instructions to cause the processor to:
demodulate sub-carriers of a received carrier;
de-interleave a block of v symbols of the demodulated sub-carriers, including to shift the v symbols of a first one of the demodulated sub-carriers by the predetermined number of symbols relative to the v symbols of a second one of the demodulated sub-carriers in the wrap-around fashion and shift the v symbols of remaining ones of the demodulated sub-carriers by the predetermined number of symbols relative to the v symbols of respective other ones of the of the demodulated sub-carriers in the wrap-around fashion;
compute log likelihood ratios (LLRs) for codewords based on the de-interleaved block; and
block-decode a bit stream based on the LLRs.

18. The non-transitory computer-readable medium of claim 10, further including instructions to cause the processor to:
arrange the v symbols of the sub-carriers as an array of respective cells in accordance with, $$y(p,q) = x(p,(p+q) \bmod v), \text{ where,}$$

$y(p,q)$ is a cell at $p^{th}$ row of a $q^{th}$ column of the array,
p is a sub-carrier count,
q is a symbol count,
$x(p,(p+q) \bmod v)$ represents a $(p+q)^{th}$ one of the v symbols of a $p^{th}$ one of the subcarriers, and
MODv represents a modulus wrap-around operation to increment p and q upon each determination of $y(p,q)$, and to reset q when q reaches v, until $y(p,q)$ is determined for all of the v symbols of the subcarriers.

19. A system, comprising, a processor and memory configured to;
map bits to symbols of multiple sub-carriers;
interleave a block of v symbols of the sub-carriers, including to shift the v symbols of a first one of the sub-carriers by a predetermined number of symbols relative to the v symbols of a second one of the sub-carriers in a wrap-around fashion and shift the v symbols of remaining ones of the sub-carriers by the predetermined number of symbols relative to the v symbols of respective other ones of the of the sub-carriers in the wrap-around fashion, wherein v is an integer; and
provide the interleaved block to a modulator.

20. The system of claim 19, wherein the processor and memory are further configured to, for a first symbol of the block:
sequentially select one of the v symbols of each of the sub-carriers based on a sub-carrier count and a symbol count;
increment the sub-carrier count and the symbol count for each selected symbol of a sub-carrier;
reset the symbol count when the symbol count reaches v; and
reset the sub-carrier count and process a second symbol of the block when the sub-carrier count reaches a number of the sub-carriers.

\* \* \* \* \*